(12) United States Patent
Erdman et al.

(10) Patent No.: US 8,520,417 B2
(45) Date of Patent: Aug. 27, 2013

(54) DC VOLTAGE REGULATOR

(75) Inventors: William L. Erdman, Moraga, CA (US); Michael R. Behnke, Livermore, CA (US); Miguel Núñez Polo, Sarriguren (ES); Ricardo Royo Garcia, Sarriguren (ES)

(73) Assignee: Acciona Windpower, S.A., Sarriguren (Navarra) (ES)

( * ) Notice: Subject to any disclaimer, the term of this patent is extended or adjusted under 35 U.S.C. 154(b) by 68 days.

(21) Appl. No.: 12/058,461

(22) Filed: Mar. 28, 2008

(65) Prior Publication Data

US 2009/0008937 A1  Jan. 8, 2009

Related U.S. Application Data

(60) Provisional application No. 60/921,272, filed on Mar. 30, 2007.

(51) Int. Cl.
*H02M 5/45* (2006.01)

(52) U.S. Cl.
USPC .......................................................... 363/37

(58) Field of Classification Search
USPC ......... 323/220, 223, 224, 226, 284, 282–283; 363/20, 34, 53, 35–37, 97; 290/44
See application file for complete search history.

(56) References Cited

U.S. PATENT DOCUMENTS

| | | | |
|---|---|---|---|
| 4,689,733 A | 8/1987 | Guth et al. | |
| 4,819,066 A * | 4/1989 | Miyagi | 347/248 |
| 4,994,684 A * | 2/1991 | Lauw et al. | 290/52 |
| 5,289,041 A | 2/1994 | Holley | |
| 5,463,344 A | 10/1995 | Temple | |
| 5,822,200 A | 10/1998 | Stasz | |
| 6,101,105 A | 8/2000 | Gilmore | |
| 7,425,771 B2 * | 9/2008 | Rivas et al. | 290/44 |
| 2003/0099120 A1 * | 5/2003 | Yu | 363/50 |
| 2003/0197494 A1 * | 10/2003 | Kanouda et al. | 323/287 |
| 2004/0085051 A1 * | 5/2004 | Kim et al. | 323/266 |
| 2004/0240235 A1 * | 12/2004 | Min | 363/23 |
| 2005/0017656 A1 * | 1/2005 | Takahashi et al. | 315/248 |
| 2007/0246943 A1 * | 10/2007 | Chang et al. | 290/44 |
| 2009/0001725 A1 * | 1/2009 | Llorente Gonzalez et al. | 290/44 |
| 2009/0206606 A1 * | 8/2009 | Jorgensen et al. | 290/44 |

FOREIGN PATENT DOCUMENTS

| | | | |
|---|---|---|---|
| WO | WO 2004070936 A1 * | 8/2004 | |
| WO | WO 2004098261 A2 * | 11/2004 | |
| WO | WO 2006069569 A1 * | 7/2006 | |

* cited by examiner

*Primary Examiner* — Adolf Berhane
*Assistant Examiner* — Jeffrey Gblende
(74) *Attorney, Agent, or Firm* — Chadbourne & Parke LLP (57) ABSTRACT

The disclosure details implementations of apparatuses, methods, and systems for regulating DC bus voltages. In an implementation, the system is configured to regulate the DC bus voltage directly by operating at the DC bus rather than indirectly on the AC side of the DC bus. In one implementation, the DC voltage regulator is configured with components including a DC voltage regulator power control board, a switching device, a resistor, and a flyback diode. In one non-limiting implementation example, the DC voltage regulator may be used to control the DC bus voltage of a doubly fed induction generator of a wind turbine. In this implementation, the DC voltage regulator effectively protects the converter of the induction generator and also reduces the transient torques on the generator shaft during voltage irregularities. This, in turn, reduces excessive wear on the wind turbine gearbox by limiting fatigue loads on the gear teeth that may result from transient torques.

38 Claims, 7 Drawing Sheets

Fig. 4A
Controller Diagram

Fig. 4B
HW System Controller Diagram

DC VOLTAGE REGULATOR

This disclosure claims priority to under 35 U.S.C. §119(e) and incorporates by reference U.S. Provisional Patent Application titled "DC Regulator Replacement of AC Crow Bar in Doubly Fed Induction Generators for Wind Energy Applications," filed Mar. 30, 2007, as Ser. No. 60/921,272.

FIELD

The present disclosure is generally directed to apparatuses, methods and systems for regulating voltages, and more particularly, to apparatuses, methods and systems for regulating DC bus voltages during voltage irregularities.

BACKGROUND

Power control circuitry may include components that are susceptible to damage in adverse operational conditions. For example, solutions are necessary for controlling and regulating DC bus voltages during adverse operational conditions including possible voltage irregularities (e.g., voltage events, utility grid failures, fluctuations across a utility power grid, or power imbalances in a power converter, among others). DC voltage regulation is useful in applications such as a doubly fed induction generator used in wind turbines. AC crowbar power control circuits have been implemented with doubly fed generators in an attempt to regulate the DC bus voltage. The AC crowbar module attempts to regulate the DC bus voltage by modifying the operational circuit characteristics of the AC side of a power control circuit during a voltage irregularity. However, the use of an AC crowbar within power control circuits is not an effective solution for regulating the voltage of DC during voltage irregularities. In certain instances, a triggered AC crowbar connected with power control circuits may result in excessive DC bus voltages that cause damage to certain circuit components, as well as excessive wear to the generator the power control circuits are configured to control.

SUMMARY

The disclosure details implementations of apparatuses, methods, and systems for directly regulating DC bus voltages during voltage irregularities. This is important in applications such as DC voltage regulation of power control circuits associated with a wind turbine generator. In one possible implementation, the system may be configured to regulate the DC bus voltage in a power control circuit directly by modifying power control circuit operational characteristics at a DC bus, rather than indirectly attempting to control DC operating characteristics vicariously through AC circuit interaction. In one implementation, the DC voltage regulator includes a crowbar control component operatively connected with, a switching device, a resistor, and a flyback diode.

In one non-limiting implementation example, the DC voltage regulator may be used to control the DC bus voltage of a doubly fed induction generator implemented within a wind turbine installation. In this implementation, the DC voltage regulator effectively protects the power converter of an induction generator and reduces transient torques on the generator shaft during voltage irregularities. This in turn, protects the wind turbine gearbox by limiting the fatigue loads on the generator's gear teeth.

Other non-limiting implementations of DC voltage regulators discussed herein include alternate doubly fed generator installations such as, hydroelectric generation installations, and/or variable speed diesel generator sets or microturbines.

BRIEF DESCRIPTION OF THE DRAWINGS

The accompanying drawings illustrate various non-limiting, representative, inventive aspects in accordance with the present disclosure.

The leading number of each reference numeral indicates the first drawing in which that reference numeral is introduced. For example, doubly fed generator 110 is first introduced in FIG. 1.

DETAILED DESCRIPTION

Various implementations of DC crowbar power control ("DC CPC") systems facilitate controlling and regulating DC bus voltages. In various implementations, a DC CPC system may be configured to regulate the DC bus voltage by changing the operational characteristics directly at the DC bus of a power control circuit.

For the purposes of illustration, various aspects of a DC CPC system will be described in the context of an implementation of the DC CPC implemented with a doubly fed induction generator system used as an electrical generator in a wind turbine. However, it is to be understood that although the following description discusses regulating the DC bus voltage of a doubly fed induction generator, the DC CPC facilitates significant flexibility and aspects of the system and various DC CPC components may be configured to control and regulate DC bus voltages of a wide variety of power control circuits.

Figure 1A:
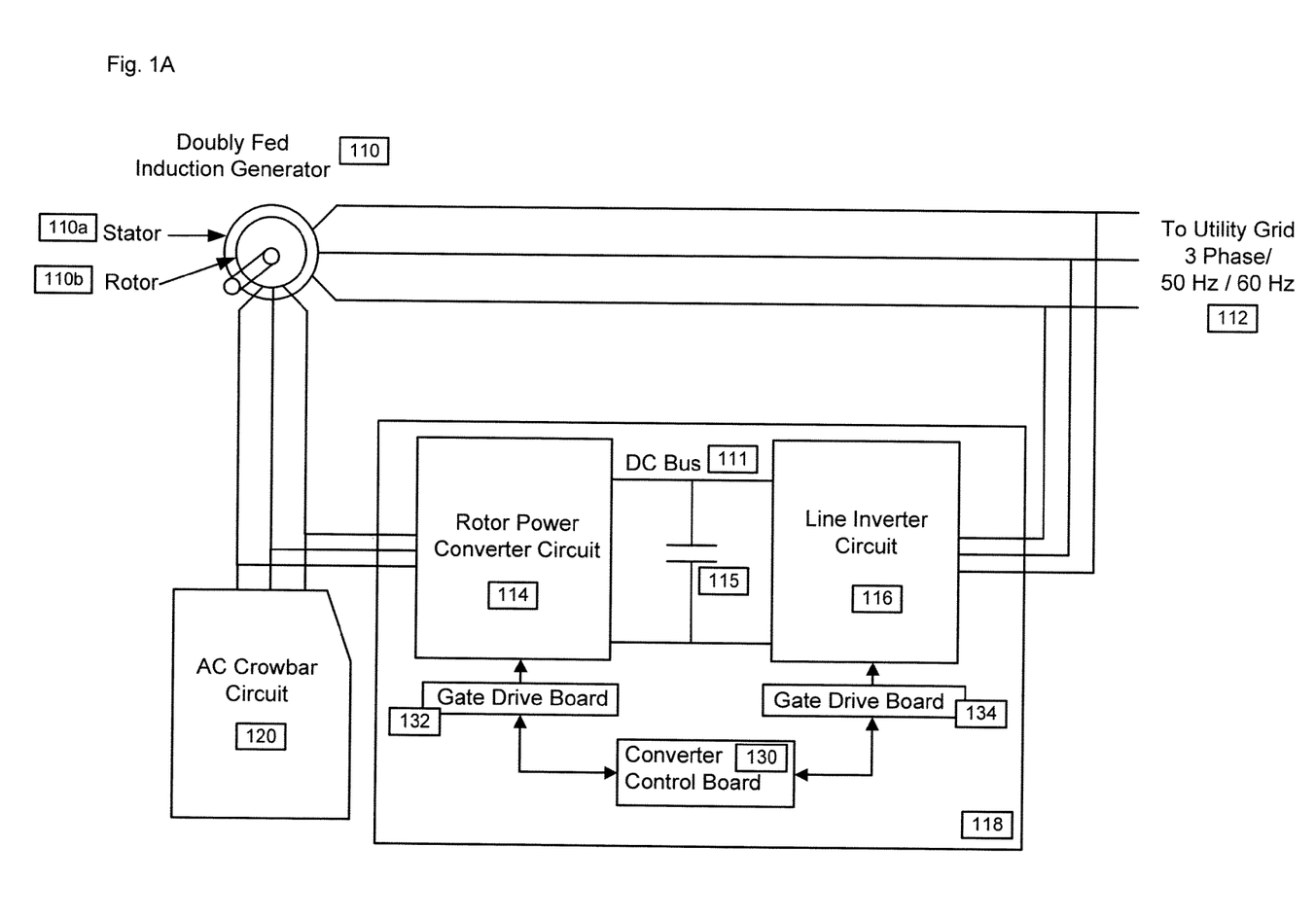
FIGS. 1A-1B are circuit diagrams illustrating AC crowbar components implemented with a doubly fed generator.

FIG. 1A is a circuit diagram illustrating an AC crowbar voltage regulator circuit module implemented in coordination with a power control circuit associated with a doubly fed induction generator. As illustrated in FIG. 1A, elements of this configuration include the doubly fed induction generator 110, a power converter circuit 118 and an AC crowbar circuit 120. The elements of the induction generator 110 include a stator 110a coupled to a rotor 110b—the terminology "doubly fed" denotes the fact that the induction generator 110 has two electrical connections: one at the stator 110a, and one at the rotor 110b. More specifically, in one implementation, the stator 110a circuit may be directly connected to a utility three phase system 112, and the rotor 110b circuit may be connected to a rotor power converter circuit 114.

The doubly fed induction generator system has gained popularity in wind energy applications, because the power converter circuit 118 that includes a rotor power converter circuit 114 and a line inverter circuit 116 connected by DC bus 111, may be implemented to facilitate variable speed control of a much larger induction generator 110. In doubly fed induction generator implementations, the size of the power converter circuit 118 only has to be proportional to the amount of slip the induction generator 110 may experience during operation. For example, if the generator is rated at 1.5 megawatts and has a maximum 33% slip during operation, then the power converter 118 can be rated at 33% of 1.5 megawatts, or 500 kilowatts. This facilitates a relatively inexpensive converter, particularly when compared to a fully rated converter circuit which would have to rated at the same level as the generator power level.

In one embodiment, the induction generator 110 is configured to convert mechanical energy into AC electrical energy in either the stator 110*a*, the rotor 110*b*, or both. The generated AC voltage may vary, in terms of magnitude and frequency, as compared with the relatively constant utility grid voltage and thus may not be fed directly to the electrical grid without additional processing. The power converter circuit 118 may be configured to change the time-domain characteristics of the variable frequency and magnitude AC voltage in order to make the generated power compatible with the utility grid. In one implementation, the power converter circuit 118 is configured to first convert the AC voltage to DC voltage, and subsequently the DC voltage is then converted back to AC voltage of fixed frequency and magnitude—the power converter 118 is configured as an AC/DC/AC converter. In another implementation, the rotor power converter circuit 114 may be configured to convert the variable frequency and magnitude AC voltage to DC voltage, wherein the DC electrical energy from the rotor power converter 114 output may be temporarily stored in the DC bus 111 within the electric field of a capacitor bank 115 or in the magnetic field of an inductor. In one embodiment, the AC voltage from the output of the line inverter 114 may be fed to an AC line filter that may be configured to smooth out and stabilize sinusoidal characteristics of the AC voltage. In a further embodiment, a transformer may be used to step up the voltage characteristics of the AC line filter output for transmission to the utility grid.

Figure 1B:
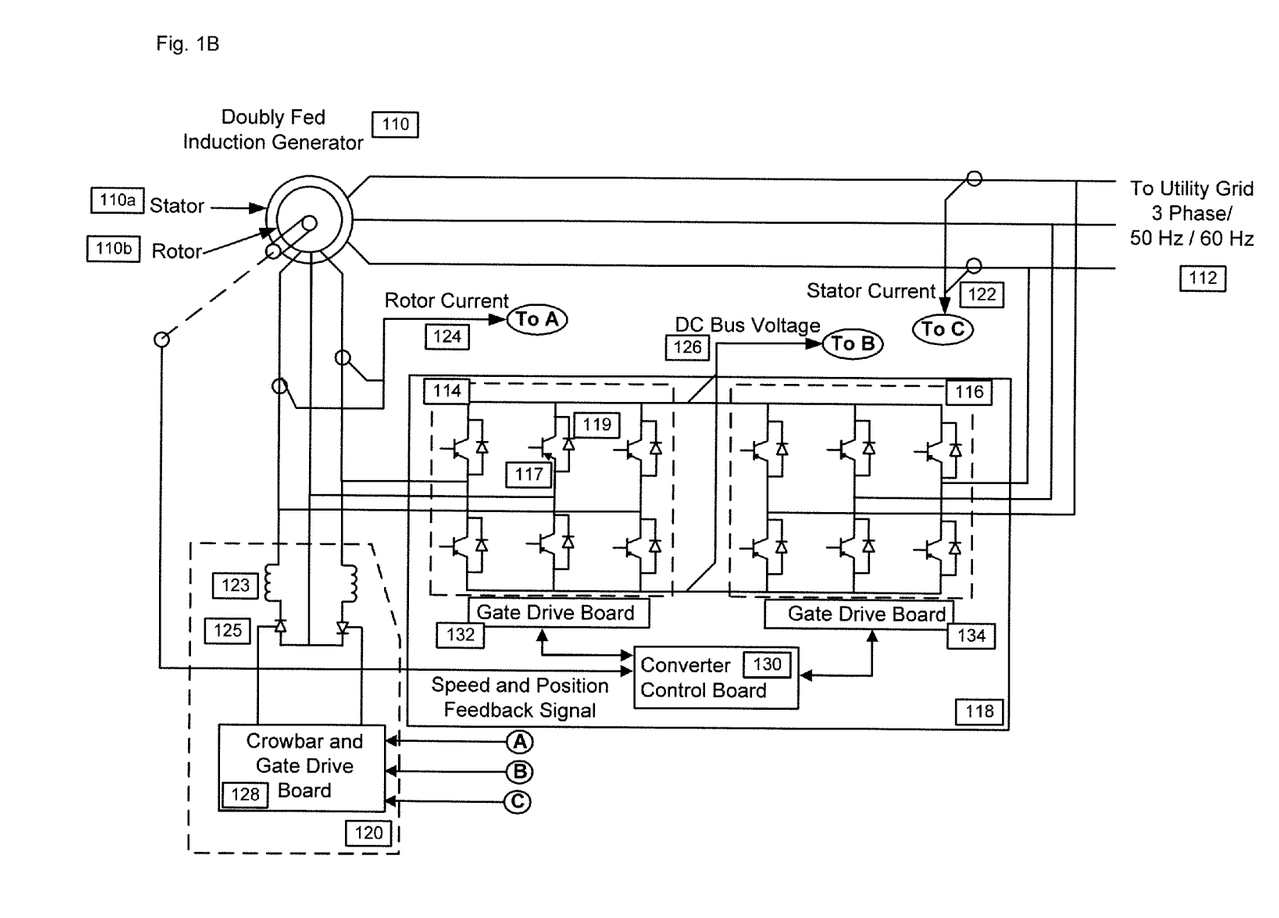

In the embodiment illustrated in FIG. 1B, the rotor power converter circuit 114 and the line inverter circuit 116 are configured with components that include power transistors 117, such as Insulated-Gate Bipolar Transistors (IGBTs), and flyback diodes 119. In one implementation, a converter control board 130 may be configured to coordinate control of the AC Crowbar module, manage operation of the gate drive boards 132/134 associated with power converter 118 and control the speed and position of the rotor 110*b*. In FIG. 1B, the converter control board 130 manages the gate drive boards 132/134 which, in turn control the operation of the power transistors 117 in the rotor power converter 114 and line inverter 116 circuits (which form power converter 118), respectively.

However, attempting to control the DC bus by manipulating an AC Crowbar has certain drawbacks during the occurrence of voltage irregularities. As discussed earlier, voltage irregularities can occur for a number of reasons, such as a utility voltage disturbance. Within the context of a doubly fed generator circuit/implementation, a voltage irregularity can result in a sudden drop in the stator voltage. This may also result in a significant increase in the rotor voltage and rotor current 124. An increase in the rotor voltage/current causes the flyback diodes 119 in the rotor power converter circuit 114 to conduct, and in turn the DC Bus voltage 126 may increase to destructive levels. The magnitude of these currents and voltages may exceed the rating of the power converter 118 and result in component failure.

As illustrated in FIG. 1B, the AC crowbar and gate drive board 128 may be configured to detect voltage irregularities and activate the AC crowbar 120 and short the rotor circuit. For example, the AC crowbar 120, connected to the rotor 110*b* circuit, is configured with components including inductors 123 and diodes 125, which are activated during a detected voltage irregularity. When activated, the diodes effectively short circuit the rotor 110*b* circuit during voltage irregularities. More specifically, as illustrated in FIG. 1B, the crowbar and gate drive board 128 may detect voltage irregularities by analyzing a combination of its inputs including the stator current input C, the rotor current input A, and the DC bus voltage input B (as illustrated in FIG. 1B). Some AC crowbar designs use all three input signals, while others may be configured to trigger the crowbar based on a subset of only one or two of the available signals. Regardless of which trigger signal is processed and relied on to activate the AC crowbar 120, ultimately the AC crowbar 120 shorts current flowing in the rotor circuit and thereby attempts to regulate the DC bus voltage by modifying operational characteristics on the AC side of the rotor power converter circuit 114.

While this type of AC crowbar control approach may protect the power converter 118 from rising rotor voltage and rotor current 124 during voltage irregularities, the AC crowbar 120 may not be effective in controlling and regulating the DC bus voltage 126. As such, during a voltage irregularity, shorting the rotor current may result in the power converter circuit 118 being exposed to excessive DC bus voltage 126 which may cause component failure. Furthermore, triggering the AC crowbar 120 results in a very large rotor current 124, which in turn, also results in high transient torques on the generator 110 shaft. These generator shaft torques may be subsequently transmitted to the wind turbine gearbox and create significant fatigue loads on the gear teeth, leading to excessive component wear and/or component failure.

DC Voltage Regulator System Overview

Figure 2:
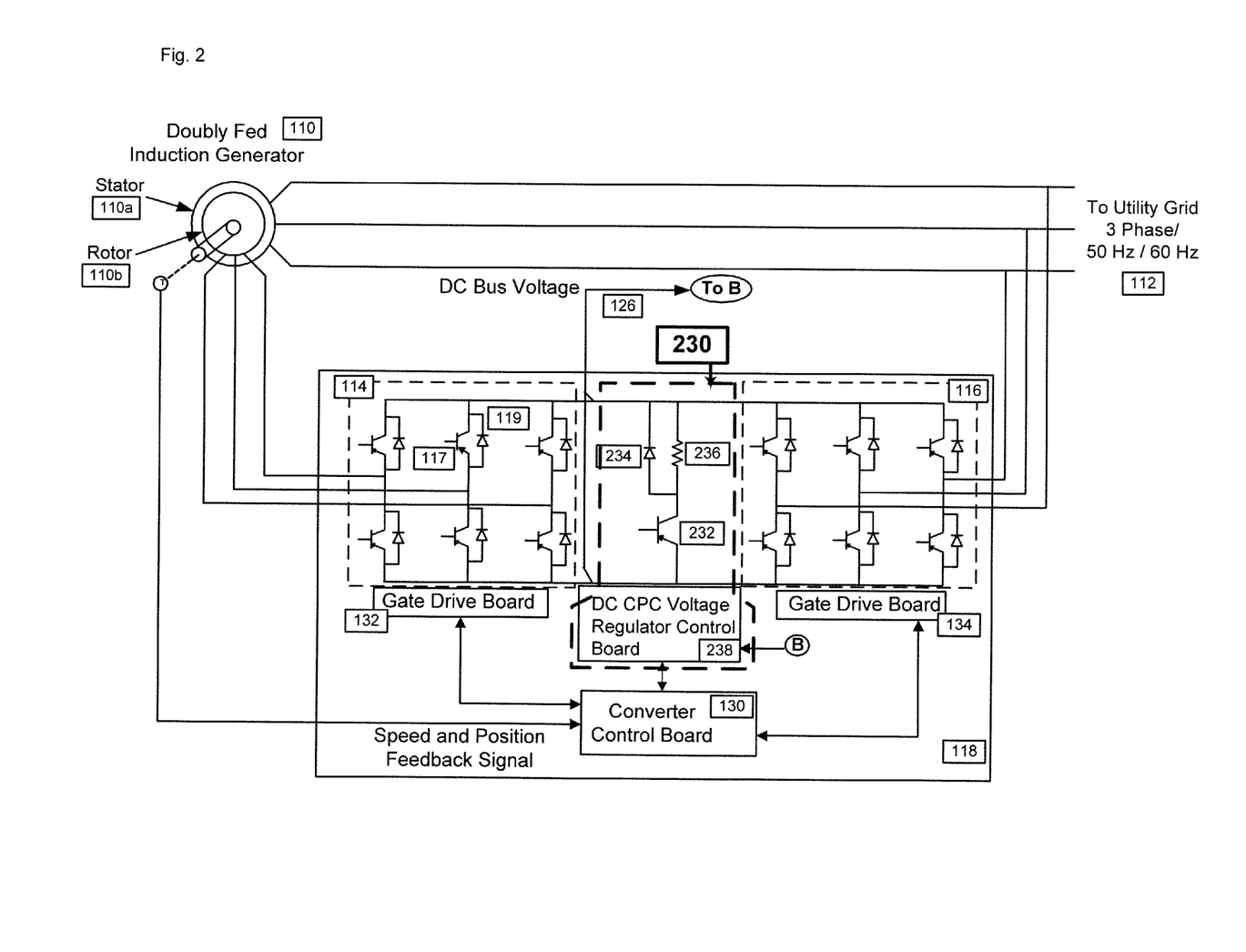
FIG. 2 is a circuit diagram illustrating aspects of a DC voltage regulator according to an implementation of the system.

FIG. 2 illustrates a DC CPC voltage regulator 230 according to an implementation of the system configured to regulate the voltage in a doubly fed induction generator 110 application. The DC voltage regulator 230 discussed herein does not result in the same risk of system component damage/failure discussed above. Instead, during a detected voltage irregularity, the DC voltage regulator 230 modifies the operational characteristics directly across the DC Bus 126, which reduces current flow in the rotor 110*b*, and thereby prevents significant transient torques on the generator shaft, which may be transmitted to the wind turbine gearbox.

In one implementation of the DC CPC illustrated in FIG. 2, the DC voltage regulator 230 is configured with components including a DC CPC voltage regulator control board 238, a switching device 232, a resistor 236, and a flyback diode 234. Various implementations of the DC CPC voltage regulator control board 238 may be described in greater detail below with regard to FIGS. 4A and 4B. As illustrated, the switching device 232 is configured as a power transistor here, but it is to be understood that the DC CPC facilitates significant flexibility. As such, switching element 232 or other components illustrated in FIG. 2 may be configured based on the needs of a particular application and other elements may be included with/or substituted for the components illustrated to facilitate the operational control characteristic as described herein. Depending on the implementation requirements, the system may incorporate gate controlled thyristors instead of Insulated-Gate Bipolar Transistors (IGBTs) in order to facilitate operation in contexts with the higher operational currents. Similarly, values associated with resistor 236 may vary based on the particular operational characteristics of the implementation. However, resistor 236 is configured to dissipate the necessary intermittent power that results from activating switching element 232. For example, if a nominal DC bus voltage of 1050 V is to be maintained, resistor 236 may be implemented in order to allow switching for a 50% duty cycle that would facilitate maintaining an overvoltage regulation operating voltage about 1155V during a voltage irregularity. As such, operation at around 110% of the nominal DC Bus Voltage may be acceptable for a short duration (e.g., during a voltage irregularity). Depending on the implementation, the acceptable overvoltage regulation operating range may vary and in fact may be greater or less than the 10% higher than nominal DC Bus Voltage discussed in this example. Further, depending on the particular implementation, it is noted that the voltage regulator attempts to maintain the operational characteristics within a plus or minus 3% (or a different tolerance) range of the target overvoltage regulation operating voltage.

The voltage regulator discussed herein is configured to facilitate significant flexibility and may provide a support during a number of different types of voltage irregularities. For example, the voltage irregularities may include a utility grid failure (where the underlying utility power is goes away for a duration of time). Alternately, the voltage irregularity may be a power imbalance between the rotor power converter 114 and the line inverter 116 that results in a gradual increase of the DC bus voltage. In one embodiment, these power imbalances may occur when the grid utility voltage is at normal levels or at a degraded level (e.g., during the increased power demands on the utility grid experienced on a hot summer day).

In power imbalance voltage irregularities, the line inverter 116 may not be able to distribute power to the utility grid as quickly as the power is generated by turbine, which leads to the power imbalance and an increase in the DC bus voltage. For example, under normal operating conditions the rotor power converter may produce power at a rate 3% higher than the rate at which the line inverter 116 can distribute power to the utility grid. It is noted that power imbalance voltage irregularities do not necessarily necessitate as significant active regulation when compared with a utility grid failure. As such, a power imbalance event, the voltage regulator may control switching device 232 to facilitate a 10% duty cycle to achieve an overvoltage regulation operating voltage of about 1155V. Accordingly, it is to be understood that the DC voltage regulator 230 is configured to support continued operation through a wide variety of voltage irregularities or events that result in an increase in the DC bus voltage to the overvoltage reference voltage level for a particular implementation.

The DC voltage regulator 230 is configured to transition operational characteristics back to the nominal DC Bus voltage when the voltage irregularity ends. For example, the DC voltage regulator 236 operates in parallel with the line inverter 116, which distributes power to the utility grid. When the voltage irregularity ends, the line inverter 116 transitions to normal operation and regain its ability to distribute power to the grid, which leads to a decrease of the DC bus voltage back to the nominal operational levels. In this way, the overvoltage regulator seamlessly becomes operative and inoperative.

As part of the voltage regulator 230, flyback diode 234 may be used to provide a low impedance path for parasitic inductive current that may flow in the DC voltage regulator circuit. When the DC voltage regulator 230 is implemented, flyback diodes 119 connected with the power transistors 117 shown in the rotor power converter circuit 114, are also configured to handle high intermittent currents during a voltage irregularity event.

As will be discussed in greater detail below, one of the inputs to the DC CPC voltage regulator control board 238 is DC bus voltage B. An output from the DC CPC voltage regulator control board 238 is connected to the switching device 232 and used to switch the converter 118 between on and off states when a voltage irregularity is detected. The DC CPC control of switching device 232 is described in greater detail with regard to FIGS. 3A-3C.

Figure 3A:
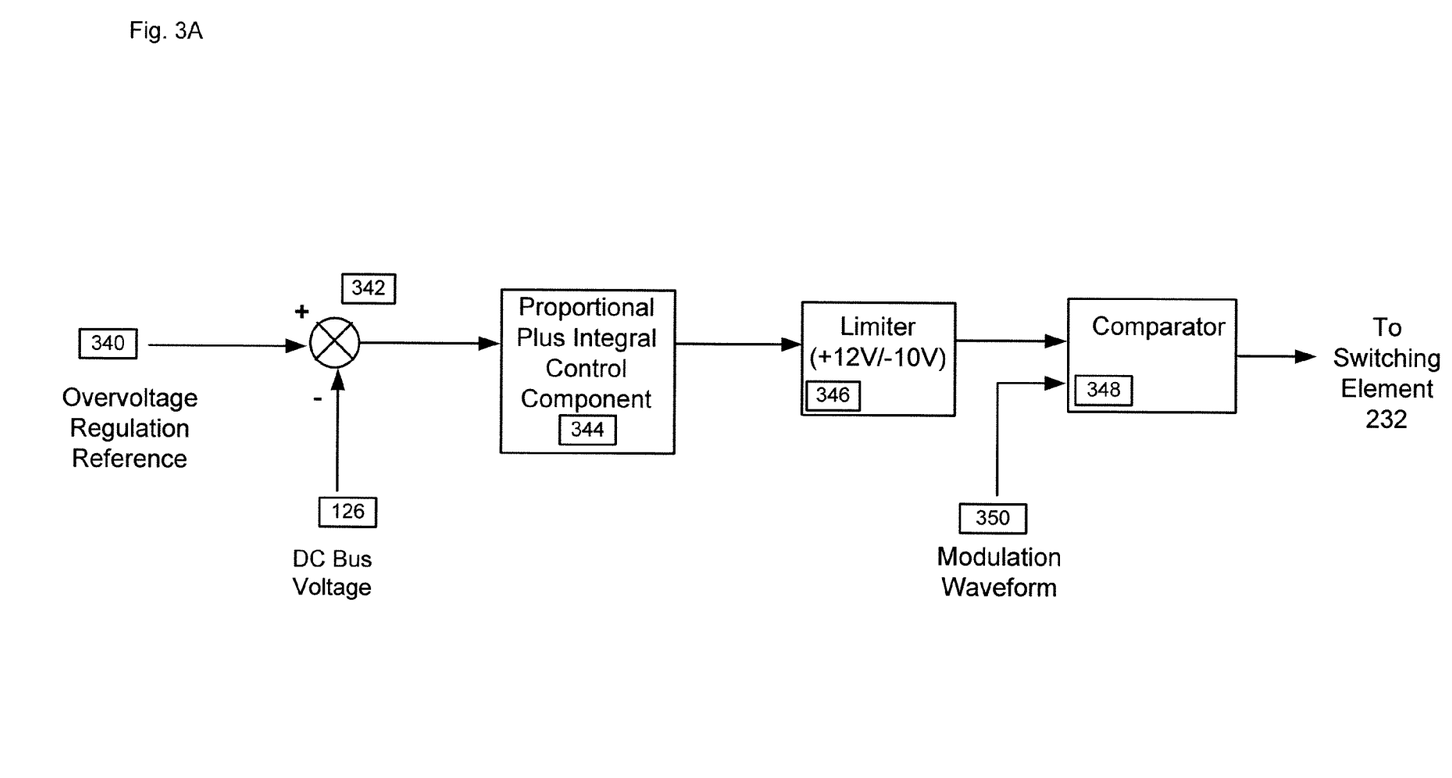
FIGS. 3A-3C illustrate aspects of the operational characteristics of the DC voltage regulator according to an implementation of the system.

FIG. 3A illustrates operational aspects of the voltage regulator control board 238 according to an implementation of the DC CPC. As illustrated in FIG. 2, the DC CPC voltage regulator control board 238 has one input B that is connected to the DC bus voltage 126. In a DC CPC implementation, a system administrator may use the value X of the nominal operating point of the DC bus voltage 126 in order to determine an overvoltage regulation reference 340, which defines a control trigger point that initiates DC CPC active control. For example, the administrator may set the overvoltage regulation reference 340 at 110% of the value of the nominal DC bus voltage (X). So, if the value of the nominal operating point of the DC bus voltage 126 is 1050 VDC, then the overvoltage regulation reference 340 may be set at 1155 VDC. In this case, nominal operation would place the level of the DC bus voltage 126 below the level of the overvoltage regulation reference 340. Accordingly, the difference between the two signals, calculated by the summing junction 342, would be positive. This positive value is applied to the input of a proportional plus integral control component ("P+I Controller") 344.

In an implementation, the P+I control component 344 in coordination with the modulation waveform generator are configured to maintain operation around the overvoltage reference value during a voltage irregularity. The DC CPC controller coordinates the P+I controller and the waveform generator to actively turn on and off switching element 232 to maintain operation within a narrow range around the overvoltage reference value.

An output from the P+I Controller 344 may be clamped by limiter 346. Comparator 348 is configured to compare the clamped output of the limiter 346 to the level of a modulation waveform 350. The clamped output facilitates nominal operation of the limiter 346 output signal above the level of a modulation waveform 350.

Figure 3B:
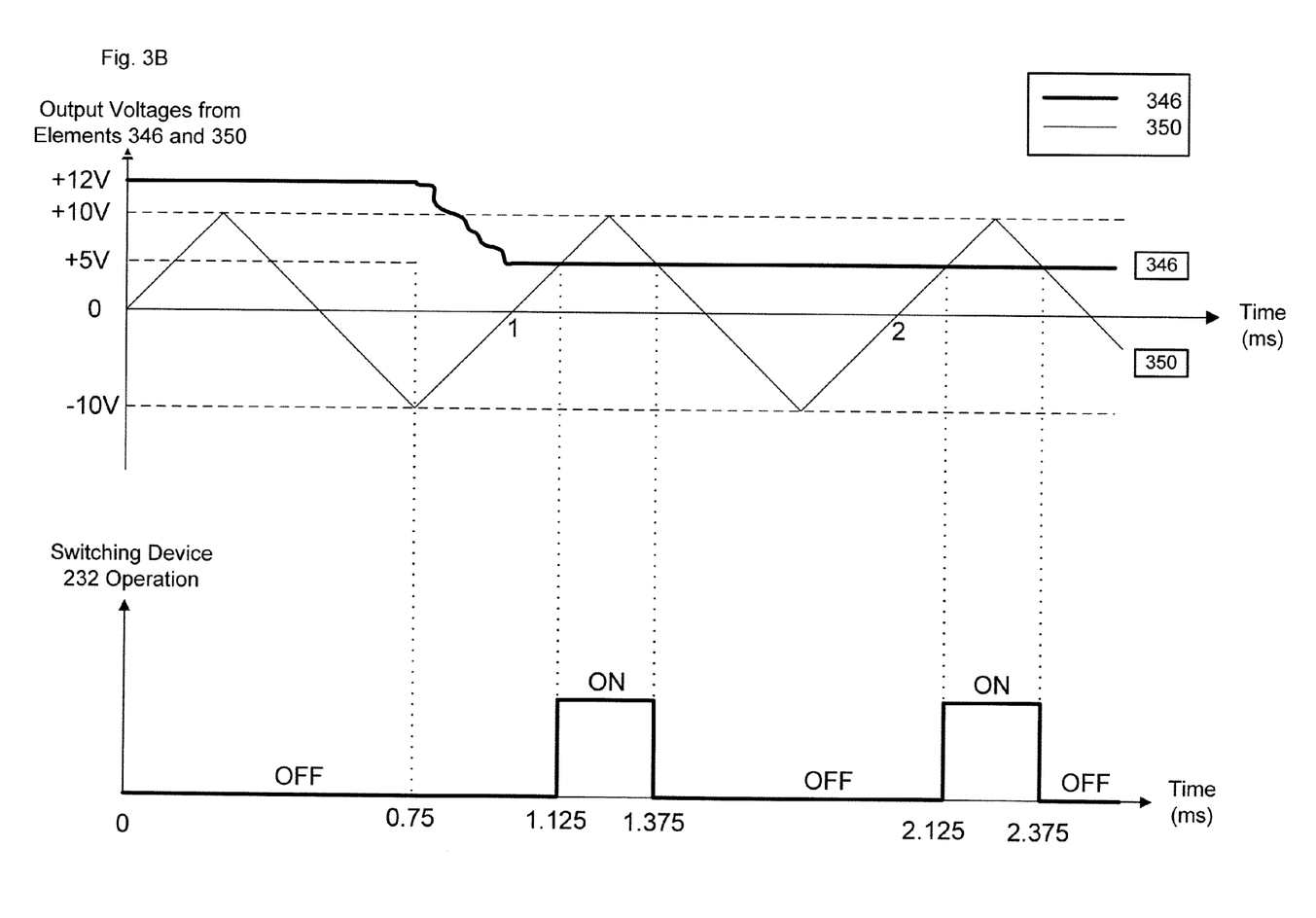

FIG. 3B illustrates an example of the DC CPC's operational characteristics with regard to comparator 348. As illustrated, the modulation waveform 350 which may be initiated by the controller or an independent waveform generator, is illustrated as a triangular wave that oscillates between +/−10 V and has a frequency of 1 kHz. In another implementation, the modulation waveform may be configured with different amplitude, frequency characteristics, or even as a different type of waveform such as a sawtooth wave, depending on the operational characteristics of the implementation. In an example, nominal operation is based on a waveform of the limiter 346 output at +12 V.

Referring back to FIG. 3B, during the time period from 0 to $t_1$, the output of the limiter 346 is at +12V and the limiter output is greater than the voltage value of the triangular modulation waveform 350. As such, device 232 is turned 'off' from 0 to $t_1$. The generator maintains normal operation and operates as if the DC voltage regulator 230 is not present. However, during a voltage irregularity event the output of limiter 346 (illustrated as the transition from +12V to +5V between times 0.75 ms and 1 ms), excess rotor current 124 is pumped into the DC bus through the flyback diodes 119 of the rotor power converter circuit 114. This causes the DC bus voltage 126 to rise and when it exceeds the overvoltage regulation reference 340 (from FIG. 3A), the summing junction output value 342 (input for the P+I control component from FIG. 3A) is reduced. Accordingly, the output of the P+I control component 344 (from FIG. 3A) also begins to fall to a level resulting in the output signal of the limiter 346 falling to +5V at time 1 ms.

The first time at which the level of the output of the limiter 346 (which has transitioned to +5V), intercepts the triangular modulation waveform 350 occurs at time 1.125 ms. This initiates a switch of the transistor 232 to an 'on' state. Switching the transistor 232 'on' provides a low impedance path for the DC bus voltage 126 to be discharged through. The P+I controller 344 (from FIG. 3A) continues to modulate the on and off time of the switching device 232 during the voltage irregularity event by controlling the level of the voltage of the limiter 346 output. Note that the transistor 232 turns back off at time 1.375 ms, and then turns on again for the time period 2.125 ms through 2.375 ms. The P+I controller is configured to coordinate the correct modulation on and off time to maintain the DC bus voltage 126 at the overvoltage reference voltage for the duration of the voltage irregularity. By way of example only, the P+I controller is configured to maintain the voltage within a range of plus or minus 3% of the target overvoltage reference voltage levels for the particular implementation. It is to be understood that, other implementations may have acceptable ranges that are different that the 3% discussed in this example.

Because the rotor circuit is harnessed to generate a relatively high DC bus voltage 126, the rotor current 124 that flows into the link is substantially smaller than the current that flows from the shorted rotor 110b in the AC crowbar of FIG. 1. Accordingly, the DC voltage regulator of FIG. 2 significantly reduces the risk of excessive transient torque on the generator 110 shaft, as well as excessive transient loads on the wind turbine gearbox.

Figure 3C:
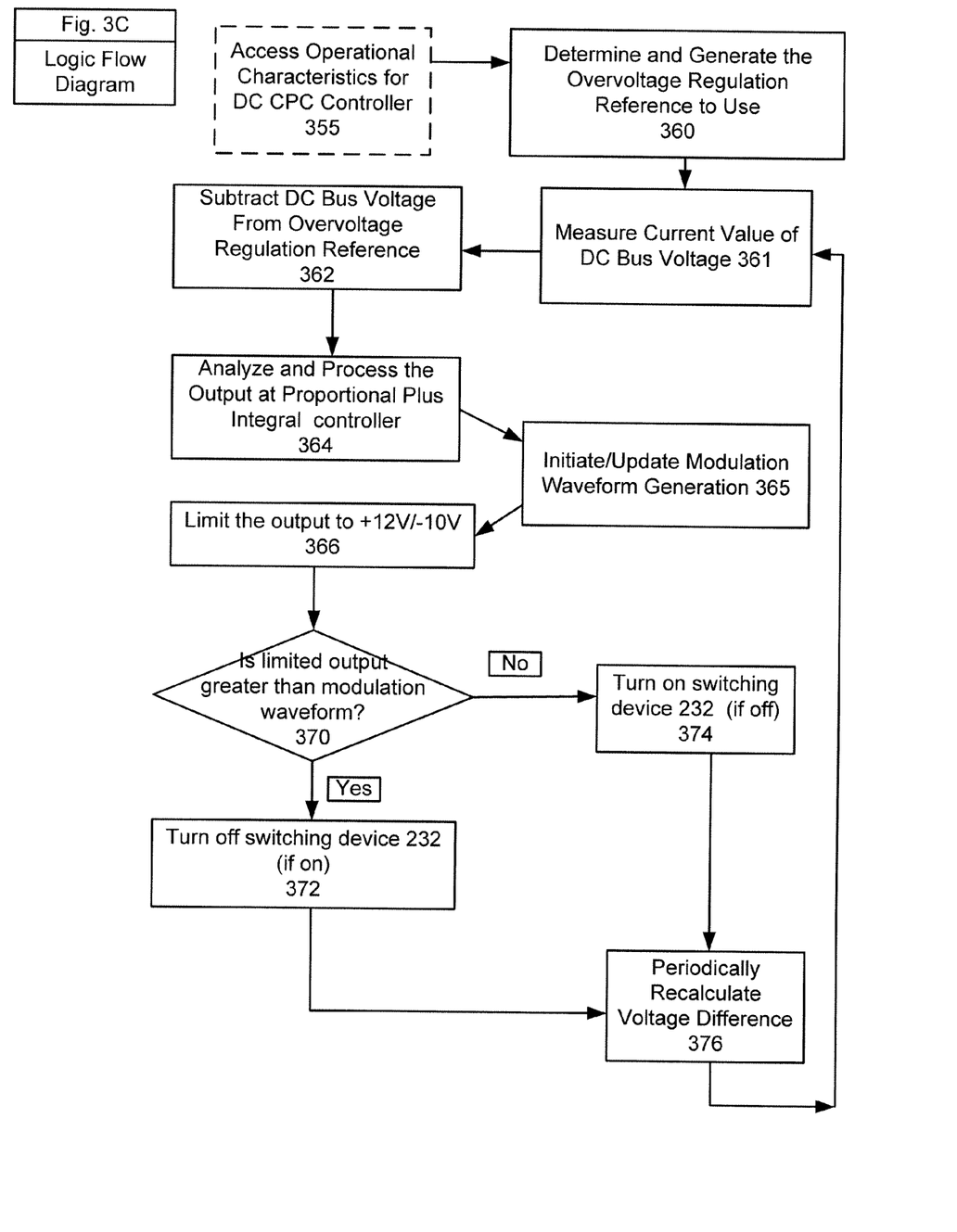

FIG. 3C illustrates aspects of a logic flow diagram associated operation of the DC CPC voltage regulator control board 238 according to an implementation of the DC CPC. In certain implementations, the DC CPC Controller 238 may be configured to access DC CPC memory to obtain certain operational variables 355 used in controlling the DC CPC. For example, the DC CPC controller may obtain an operational variable such as the nominal operating DC Bus voltage (X) for a particular DC CPC implementation or an overvoltage reference tolerance variable used to determine the overvoltage reference.

The value X, the nominal DC bus voltage 126, is obtained and used to determine and generate 360 the overvoltage regulation reference 340. In one implementation, the overvoltage regulation reference 340 may be set at 110% times the value of X. For example, as discussed above, if the value X of the nominal operating point of the DC bus voltage 126 is 1050 VDC, then the overvoltage regulation reference 340 may be set at 1155 VDC. Alternate implementations may require finer overvoltage operational regulation. Such implementations may have an overvoltage regulation reference that is set within a range that is less than or equal to 10% of the nominal DC bus voltage.

The DC CPC voltage regulator control board 238 measures the current value of the DC bus voltage 361 and then determines the difference 362 between the current value of the DC bus voltage 126 and the value of the overvoltage regulation reference 340. The DC CPC processes the value of this voltage difference 364 at the proportional plus integral controller 344. In one implementation during voltage irregularity events, the analysis and processing 364 allows the proportional plus integral controller 344 to coordinate the correct modulation on and off time for maintaining the DC bus voltage 126 within a narrow (e.g. 3%) range around the set point level of the overvoltage regulation reference 340. In another implementation, the DC CPC controller may also be responsible for initiating, generating or updating the modulation waveform 365.

An output of the proportional plus integral controller 344 is then limited 366 to be within an operational voltage range, for example: +12/−10 V. In the event that the voltage value of the limited output 346 is greater than the modulation waveform 370, switching device 232, is switched 'off' 372 if switching device 232 is currently 'on.' If, however, the DC CPC voltage regulator control board 238 determines that the limited output voltage value 346 is less than the modulation waveform voltage value 350, then the control board 238 generates and transmits the necessary signal to turn 'on' the switching device 232, if switching device 232 is currently 'off.' Periodically, the voltage regulator control board 238 may cycle back to 376 in order to recalculate the voltage difference between the value of the DC bus voltage 126 and the value of the overvoltage regulation reference 340. In an implementation, the DC CPC may be configured to periodically cycle at 1-2 kHz. Depending on the processing constraints of the particular DC CPC, the frequency of the periodic recalculation will be established to at least maintain the integrity of modulation waveform DC regulating switching.

Depending on the particular implementation, various aspects of system control features/functionality may be achieved through hardware solutions, software solutions, or some combination of the two. Two example implementations of the DC CPC control components are discussed in greater detail below in FIGS. 4A-4B. In some implementations, the DC CPC voltage regulator control board 238 may also be implemented as part of the converter control board 130.

Figure 4A:
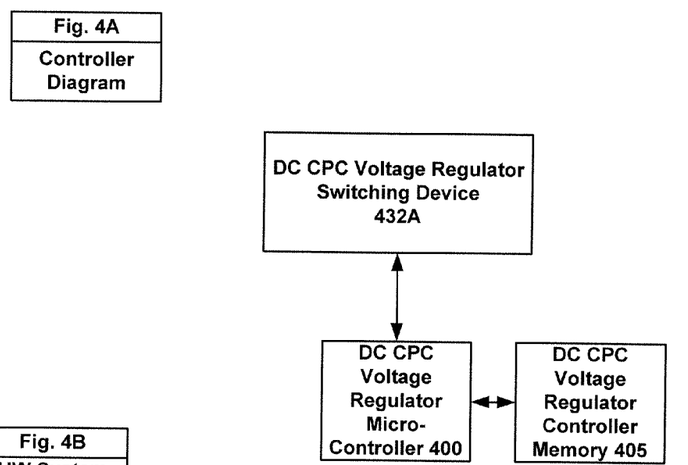
FIGS. 4A-4B illustrates aspects of the DC voltage regulator control components according to various implementations of the system.

FIG. 4A illustrates an implementation of the DC CPC controller implemented as a micro-controller 400 working in tandem with DC CPC controller memory 405. DC CPC controller memory may be configured to store a variety of operational characteristics for a particular implementation, including, but not limited to the value of the nominal DC bus operating voltage, a overage reference tolerance variable, modulation waveform characteristics, periodic re-assessment measurement variables and/or any other number of possible operational variables.

Depending on the particular implementation, features of the DC CPC may be achieved by implementing a micro-controller such as Intel's 8051 micro-controller. Some implementations may also rely on Digital Signal Processing ("DSP"), Field Programmable Gate Array ("FPGA"), and/or Application-Specific Integrated Circuit ("ASIC") technology to implement certain features of the DC CPC.

For example, a MC68HC16 microcontroller, commonly manufactured by Motorola Inc., may be implemented as a DC CPC controller. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Alternately, some implementations of the DC CPC may be configured with DSP Components that are configured and used to achieve a variety of features or signal processing. Depending on the particular implementation, DSP components may include software solutions, hardware solutions, or some combination of both hardware/software solutions.

Alternately, DC CPC features discussed herein may be achieved through implementing field-programmable gate arrays (FPGAs), which are a semiconductor devices containing programmable logic components called "logic blocks", and programmable interconnects, such as the high performance FPGA Virtex series and/or the low cost Spartan series manufactured by Xilinx. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory.

A hierarchy of programmable interconnects allow logic blocks to be interconnected as needed by the DC CPC system designer/administrator, somewhat like a one-chip programmable breadboard. Logic blocks and interconnects can be programmed by the customer or designer, after the FPGA is manufactured, to implement any logical function. Alternate or coordinating implementations may implement DC CPC controller features on application-specific integrated circuit (ASIC), instead of or in addition to FPGAs. The DC CPC controllers may be developed on regular FPGAs and then migrated into a fixed version that more resembles an ASIC implementations.

Figure 4B:
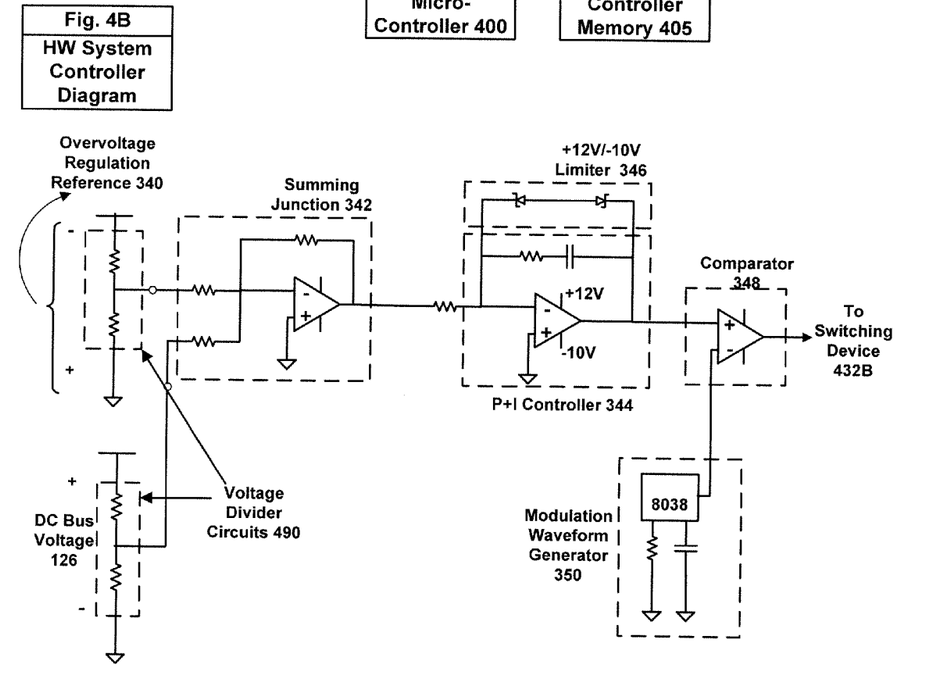

FIG. 4B illustrates aspects of a DC CPC hardware control solution and an example hardware implementation of the voltage regulator control board 238 described in FIG. 3A. As illustrated, the summing junction 342, configured to determine the difference between the value of the overvoltage regulation reference 340 and the value of the DC bus voltage, may be implemented using a standard "summing" circuit that includes an operational amplifier and three resistors. In various embodiments of the controller illustrated in FIG. 4B, voltage divider circuits 490 may be implemented with the 4 resistors having a variety of values in order to achieve a variety of operational characteristics for regulating the DC bus voltage 126.

Regardless of the particular embodiment, the output value of the summing junction 342 may be applied to the input of a P+I Controller 344. For example, in FIG. 4B, the output of the summing junction is connected with the negative input of an operational amplifier that may be part of the P+I Controller 344. The P+I Controller may also have a resistor and a capacitor connected in series between the negative input and the output of the operational amplifier as in FIG. 4B. In one implementation, the limiter 346 may be implemented as a circuit component that includes two zener diodes (having breakdown voltages of +12V and −10V) connected across the negative input and the output of the operation amplifier of the P+I Controller 344, as illustrated in FIG. 4B.

Also in the example illustrated in FIG. 4B, a triangular modulation waveform 350 may be generated using an 8038 waveform generator in coordination with a resistor and a capacitor. The values of the resistor and capacitor may be selected to produce a triangular waveform with a particular frequency, for example 1 kHz. However, it is to be understood that depending on the application, the frequency of the modulation waveform may be adjusted accordingly. Finally, the controller includes a comparator 348 configured to compare the output voltage of the operational amplifier of the P+I Controller 344 and the triangular waveform output 350 of the 8038 waveform generator. Comparator 348 may be implemented using an operational amplifier.

Regardless of the particular implementation, the DC CPC controller is operatively connected with DC CPC voltage regulator switching device 432A/432B in order to facilitate aspects of the features described herein.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program modules (a module collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A turbine generator DC bus voltage regulator system, comprising:
a power converter circuit that includes a converter component and a line inverter component with a DC bus junction situated between the converter component and the line inverter component configured to process power generated by an electrical power generation system;
a voltage regulator control board configured to detect a shift in the DC Bus voltage away from normal operational values during a voltage irregularity and maintain overvoltage regulation operational characteristics for the DC bus junction during the voltage irregularity, and further comprising:
an input element configured to determine a value of the DC bus junction voltage,
an overvoltage regulation component configured to determine and generate an overvoltage regulation reference signal based on a nominal operating value of the DC bus junction voltage and an overvoltage operating voltage range, and a proportional plus integral controller component configured to process the difference between an overvoltage reference signal and the DC bus junction voltage and to generate a proportional plus integral controller output signal;

a comparator component configured to continuously modulate the pulse width of a switching signal applied to the switching device during the voltage irregularity by comparing a signal based on the proportional plus integral controller output signal to a periodic waveform, to maintain the DC bus voltage within an operating range centered around the overvoltage regulation reference signal for the duration of the voltage irregularity;

a switching device connected to an output from the comparator component and a negative side of the DC bus junction;

a resistor connected in series between the switching device and a positive side of the DC bus junction configured to facilitate continuously modulated power dissipation in coordination with the switching device during the voltage irregularity and maintain overvoltage operational characteristics including an overvoltage reference operational voltage value; and a flyback diode connected in parallel to the resistor with the cathode of the diode connected to the positive side of the DC bus junction.

2. The DC voltage regulator system of claim 1, wherein the proportional plus integral controller component is configured to control the switching device to maintain the DC Bus Voltage within an operating range within 3% of the overvoltage regulation reference signal.

3. The DC voltage regulator system of claim 1, wherein the proportional plus integral controller component is configured to transition the DC Bus voltage back to the nominal operating voltage value when the voltage irregularity ends.

4. The DC voltage regulator system of claim 1, further comprising:

a limiter component configured to limit the proportional plus integral controller output signal, wherein the limiter is configured to generate a limiter output signal that represents a voltage across the DC Bus that is comparable with a modulation waveform for controlling the switching device.

5. The DC voltage regulator system of claim 4, further comprising:

a voltage generator configured to generate the modulation voltage waveform, wherein the comparator component is configured to compare the limiter output signal to the modulation waveform; and an output from the comparator operatively connected with the switching device.

6. The DC voltage regulator system of claim 5, wherein the voltage irregularity involves a power imbalance between the converter component and the line inverter component while the utility grid is active.

7. The DC voltage regulator system of claim 6, wherein the utility grid is active, but operated at a degraded state.

8. The DC voltage regulator system of claim 5, wherein the voltage irregularity involves a utility grid failure.

9. The DC voltage regulator system of claim 5, wherein the system is configured to control the switching device based on the comparator output.

10. The DC voltage regulator system of claim 9, wherein the system is configured to activate the switching device when the limiter output signal is less than the modulation waveform.

11. The DC voltage regulator system of claim 9, wherein the system is configured to deactivate the switching device when the limiter output signal is greater than the modulation waveform.

12. The DC voltage regulator system of claim 9, wherein the overvoltage operating voltage range is determined based on operational characteristics of the power control circuit and selected based on component tolerances.

13. The DC voltage regulator system of claim 12, wherein the overvoltage operating voltage range is established at 10% of the nominal DC bus junction voltage.

14. The DC voltage regulator system of claim 9, wherein the switching device is an insulated-gate bipolar transistor.

15. The DC voltage regulator system of claim 9, wherein the switching device is a gate controlled thyristor.

16. The DC voltage regulator system of claim 9, wherein the modulation voltage waveform is a modulation wave with a frequency configured to achieve a 50% duty cycle for controlling the switching device.

17. The DC voltage regulator system of claim 16, wherein the modulation voltage waveform is configured as a triangle waveform.

18. The DC voltage regulator system of claim 16, wherein the modulation voltage waveform is configured as a sawtooth waveform.

19. The DC voltage regulator system of claim 16, wherein the modulation voltage waveform oscillates between +10V and −10V.

20. The DC voltage regulator system of claim 9, wherein the limiter is configured to limit the value of the output voltage of the proportional plus integral controller to facilitate comparison with the voltage of the modulation waveform.

21. The DC voltage regulator system of claim 16, wherein the limiter is configured to limit the value of the output voltage of the proportional plus integral controller to +12 V to −10 V.

22. The DC voltage regulator system of claim 1 further comprising:

a doubly fed induction generator including a rotor circuit operatively connected with the power converter circuit and a stator circuit operatively connected with a utility grid, wherein the rotor circuit is operatively connected with the DC voltage regulator system and the line inverter component.

23. A method of regulating a turbine generator DC bus voltage with a DC crowbar controller, comprising:

determining a value of the DC bus voltage;

determining a value of an overvoltage regulation reference signal voltage;

generating the overvoltage regulation reference voltage at the determined value; and regulating the value of the DC bus voltage by processing, via a proportional plus integral controller, the difference between an overvoltage reference signal and the DC bus junction voltage and generating a proportional plus integral controller output signal, and continuously modulating, via comparator, the pulse width of a switching signal applied to a switching device during a voltage irregularity by comparing a signal based on the proportional plus integral controller output signal to a periodic waveform, to maintain the DC bus voltage within an operating range centered around the overvoltage regulation reference voltage for the duration of the voltage irregularity.

24. The method of claim 23, wherein regulating the value of the DC bus voltage maintains the DC Bus Voltage within an operating range within 3% of the overvoltage regulation reference voltage.

25. The method of claim 23, wherein regulating the value of the DC bus voltage transitions the DC Bus voltage back to the nominal operating voltage value when the voltage irregularity ends.

26. The method of claim 23, wherein regulating the value of the DC bus voltage further comprises:
determining the voltage difference between the determined values of DC bus voltage and the overvoltage regulation reference voltage to detect a shift in the DC Bus voltage away from normal operational values during a voltage irregularity.

27. The method of claim 26, wherein regulating the value of the DC bus voltage further comprises:
limiting the processed voltage difference, wherein the processing and limiting are configured to generate an output that represents a voltage across the DC bus that is comparable with a modulation waveform for controlling the switching device.

28. The method of claim 27, wherein regulating the value of the DC bus voltage further comprises:
generating a modulation voltage waveform;
comparing a value of the limited output voltage with a value of the modulation voltage waveform; and
switching on and off a switching device based on the comparison of the value of the limited output voltage and the value of the modulation voltage waveform.

29. The method of claim 28, wherein the voltage irregularity involves a power imbalance between the converter component and the line inverter component while the utility grid is active.

30. The method of claim 29, wherein the utility grid is active, but operated at a degraded state.

31. The method of claim 28, wherein the voltage irregularity involves a utility grid failure.

32. The method of claim 27, wherein a switching device operatively connected with a DC Bus is operated in an active position if the value of the limiter output voltage is determined to be less than the value of the modulation voltage waveform.

33. The method of claim 32, wherein a switching device operatively connected with a DC Bus is operated in an off position if the value of the limiter output voltage is determined to be greater than the value of the modulation voltage waveform.

34. The method of claim 23, wherein the overvoltage regulation reference voltage is selected based on the operating characteristics and components associated with a doubly-fed induction generator in a wind turbine.

35. The method of claim 34, wherein the value of the overvoltage regulation reference voltage is a value less than or approximately equal to 10% of the nominal DC bus voltage associated with a power converter for the doubly-fed generator.

36. The method of claim 34, wherein the switching device is switched at a 50% duty cycle to maintain the DC bus voltage at the value of the overvoltage regulation reference voltage.

37. The method of claim 23, further comprising:
transitioning the DC Bus voltage back to nominal operating voltage value after DC crowbar controller determines the voltage irregularity has ended.

38. The method of claim 1, wherein the pulse width is continuously modulated to match times when the periodic waveform exceeds the signal based on the proportional plus integral controller output signal.

* * * * *